United States Patent
LaForge (10) Patent No.: US 9,546,626 B2
(45) Date of Patent: Jan. 17, 2017

(54) DEPTH COALESCING FILTER WITH BARRIER MEDIA PATCH

(71) Applicant: Parker-Hannifin Corporation, Cleveland, OH (US)

(72) Inventor: Jeffrey W. LaForge, Oakdale, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 254 days.

(21) Appl. No.: 14/199,596

(22) Filed: Mar. 6, 2014

(65) Prior Publication Data

US 2014/0251889 A1 Sep. 11, 2014

Related U.S. Application Data

(60) Provisional application No. 61/773,461, filed on Mar. 6, 2013.

(51) Int. Cl.
*F02M 37/22* (2006.01)

(52) U.S. Cl.
CPC .................................. *F02M 37/221* (2013.01)

(58) Field of Classification Search
None
See application file for complete search history.

(56) References Cited

U.S. PATENT DOCUMENTS

| 4,437,986 | A | * | 3/1984 | Hutchins | B01D 17/00 210/130 |
|---|---|---|---|---|---|
| 6,716,349 | B2 | * | 4/2004 | Baracchi | B01D 17/045 210/299 |
| 6,881,328 | B2 | * | 4/2005 | Dittmann | F02M 37/221 210/104 |
| 7,527,739 | B2 | * | 5/2009 | Jiang | B01D 36/003 210/259 |
| 8,034,240 | B2 | | 10/2011 | Reiland et al. | |
| 8,470,175 | B2 | | 6/2013 | Lucas | |
| 2009/0308803 | A1 | | 12/2009 | Beard et al. | |
| 2011/0017649 | A1 | | 1/2011 | Sasur | |
| 2011/0062075 | A1 | * | 3/2011 | Lucas | B01D 29/21 210/337 |

\* cited by examiner

*Primary Examiner* — Benjamin Kurtz
(74) *Attorney, Agent, or Firm* — Renner, Otto, Boisselle & Sklar, LLP (57) ABSTRACT

A filter including a ring of filter media circumscribing a central cavity, an exit passageway downstream of the central cavity and that has an inlet opening disposed within the central cavity, and a hydrophobic foraminous membrane disk that spans the inlet opening for separating water from fuel passing through the hydrophobic foraminous membrane disk.

23 Claims, 12 Drawing Sheets

DEPTH COALESCING FILTER WITH BARRIER MEDIA PATCH

RELATED APPLICATIONS

This application claims the benefit of U.S. Provisional Application No. 61/773,461 filed Mar. 6, 2013, which is hereby incorporated herein by reference.

FIELD OF INVENTION

The present invention relates generally to fluid filters and assemblies that separate immiscible components of a fluid mixture and, more particularly, for separating water from a diesel fuel oil/water mixture.

BACKGROUND

Diesel engines have become increasingly popular for operating motor vehicles. Although this type of engine provides increased fuel economy over the more traditional gasoline engines, diesel engines are particularly sensitive to contaminates in the fuel oil supply, particularly water mixed with the fuel oil. Water mixed with fuel oil has many deleterious effects on the vehicle engine, and should be separated out for the proper operation of the diesel engine. A filter may be provided downstream (on the pressure side) of a fuel pump to protect downstream components.

Heretofore, filters have used internal support frames with or without coalescer elements to promote coalescence of water droplets that will flow down the internal support frame or drop by gravity to the bottom of the filter where they can be collected, for example, in a collection bowl. While this removes a significant portion of the water from the fuel, some water droplets may become re-entrained in the fuel and thus pass out of the filter with the fuel, particularly when the filter is located on the pressure side of the fuel pump. In the past, secondary coalescing elements have been provided within the interior of the internal support frame to capture these remaining or re-entrained water droplets. These secondary coalescing elements have included an annulus of hydrophobic material. This, however, adds considerable cost given that hydrophobic material is relatively expensive.

SUMMARY OF INVENTION

The present invention solves the problem of re-entrained water droplets in a more cost-effective and/or simpler manner. According to the present invention, a hydrophobic foraminous membrane disk is used to span an outlet passageway disposed within the central cavity of the filter through which the filtered fuel exits from the central cavity. The hydrophobic foraminous membrane disk separates re-entrained water from the fuel before exiting the filter. Consequently, only a small amount of the relatively expensive hydrophobic material is needed.

The outlet passageway preferably is formed by a tubular member that has an annular wall terminating at an entry opening that opens axially into the central cavity. The hydrophobic foraminous membrane disk may be conveniently attached at its peripheral edges to the annular wall, and particularly a rim of the annular wall, so that it spans the entry opening, whereby the fuel exiting the filter must pass through the hydrophobic foraminous membrane disk.

In a preferred embodiment, the tubular member forms a well that accommodates the nipple of a filter head to which the filter may be removably attached. The annular wall of the tubular member that projects into the central cavity preferably is radially inwardly spaced from the filter media ring or annular filter media support frame surrounding the central cavity.

The hydrophobic foraminous membrane disk preferably is generally flat, i.e. planar, but need not be exactly planar. For example, the disk may be may be slightly wavy, concave or convex. A planar disk enables the velocity of flow therethrough to be maximized while preventing water particles from reaching and damaging moisture sensitive components downstream of the filter. Maximizing flow through velocity and manufacturing and material efficiency allows for reductions of component wear and tear, assembly time, material cost, size, and/or weight of the filter assembly.

A hydrophobic foraminous membrane disk is a disk-shape structure consisting essentially of a mono-layer or sheet of material having a plurality of passages bounded by hydrophobic material and through which fluid can pass. The hydrophobic material acts to resist the flow of water through the membrane. The sheet of hydrophobic material may be in the form of a woven or non-woven screen. A mono-layer is defined as a unitary layer of material. The disk may be circular for use with circular openings, and may be of other shapes as well such as oval for use with correspondingly shaped openings. The membrane may be self-supporting or a support structure may be provided to support the membrane while preferably providing a minimum of resistance to flow through the membrane.

According to one aspect of the invention, a filter including a ring of filter media circumscribing a central cavity, an exit passageway downstream of the central cavity and that has an inlet opening disposed within the central cavity, and a hydrophobic foraminous membrane disk that spans the inlet opening for separating water from fuel passing through the hydrophobic foraminous membrane disk.

Optionally, the filter includes a top end cap sealingly bonded to a top end of the ring of filter media, and a bottom end cap sealingly bonded to a bottom end of the ring of filter media.

Optionally, a centertube is provided interiorly of the ring of filter media for supporting the ring of filter media against radial inward collapse.

Optionally, the centertube is a coalescing centertube.

Optionally, the exit passageway is formed by a tubular wall terminating at an inlet opening that opens axially into the central cavity.

Optionally, the hydrophobic foraminous membrane disk is attached at its peripheral edge to the annular wall.

Optionally, the disk is attached by at least one of bonding, staking, overmolding, and welding.

Optionally, the filter includes a top end cap sealingly bonded to a top end of the ring of filter media, and wherein the tubular member is depended from the top end cap.

Optionally, the filter includes a centertube of the ring of filter media for supporting the ring of filter media against radial inward collapse, and wherein the tubular member is directly supported by the centertube.

Optionally, the tubular member forms a well that accommodates a nipple of a filter head to which the filter may be removably attached.

Optionally, the central cavity is bounded by an annular surface defining an empty space in which the fuel can flow, and the tubular wall is radially inwardly spaced from the annular surface.

Optionally, the filter further includes a reservoir fluidly connected to the central cavity, whereby coalesced water particles accumulate in the reservoir.

Optionally, the ring of filter media has a central axis, and a planar extent of the hydrophobic foraminous membrane disk is orthogonal to the central axis.

Optionally, the ring of filter media has a central axis, and a planar extent of the hydrophobic foraminous membrane disk forms an acute angle with the central axis.

Optionally, the filter includes a housing surrounding the ring of filter media and forming a fluid passageway between the housing and the ring of filter media.

Optionally, the filter includes a tap plate having a threaded portion for removably securing the filter to a filter head.

Optionally, the filter includes a threaded portion at an upper end of the filter for a spin-on connection between the filter and a filter head.

According to another aspect of the invention, in an end cap or centertube for a filter, a tubular wall forming a through passageway extending between open ends of the tubular wall, a hydrophobic foraminous membrane disk that spans the passageway for separating water from fuel passing through the hydrophobic foraminous membrane disk, whereby water particles immersed in a fuel flowing through the hydrophobic foraminous membrane disk is unable to freely flow downstream with the fuel.

Optionally, the hydrophobic foraminous membrane disk is attached at its peripheral edge to the annular wall.

Optionally, the hydrophobic foraminous membrane disk is orthogonal to a longitudinal axis of the tubular wall.

Optionally, the hydrophobic foraminous membrane disk forms an acute angle with a longitudinal axis of the tubular wall.

According to another aspect of the invention, a filter including a ring of filter media, a cylindrical housing enclosing the ring of filter media, the housing including an end cap at an open end of the housing, with flow passages to enable fuel to enter and exit the housing and pass through the media, and a water barrier disk in the housing located in the fluid flow to prevent water in the flow from passing through an exit passage.

Optionally, the water barrier disk is supported by the end cap.

According to another aspect of the invention, a filter and filter head assembly, including a ring of filter media circumscribing a central cavity, an exit passageway downstream of the central cavity and that has an inlet opening communicating with the central cavity, and a hydrophobic foraminous membrane disk that spans the inlet opening for separating water from fuel passing through the hydrophobic foraminous membrane disk.

The foregoing and other features of the invention are hereinafter described in greater detail with reference to the accompanying drawings.

DETAILED DESCRIPTION

The principles of the present application have particular application to filters for removing not only particulates but also water from a fuel stream in a fuel system for an engine, such as a diesel or even gasoline engine of a vehicle, and thus will be described below chiefly in this context. It will of course be appreciated that principles of this invention may be more generally applicable to other filters where it is desirable to remove particulates from a primary fluid and also an immiscible fluid from the primary fluid, such to remove particulates and water from hydraulic fluid in an aircraft. Hence, fuel as used herein can represent any primary fluid being filtered and water can represent a fluid that is immiscible in the primary fluid and which is desirable to remove from the primary fluid.

Referring now in detail to the drawings and initially to FIGS. 1-4, a filter is designated generally by reference numeral 10. The filter 10 can be provided, for example, in a fuel system of a vehicle, preferably on the pressure side of a pump that pumps fuel from a fuel tank to the vehicle's engine. It will of course be appreciated that other locations and applications of the filter 10 are possible.

The filter 10 generally comprises a ring 20 of filter media that circumscribes a central cavity 34, an exit passageway 38 that has an inlet opening 48 disposed within the central cavity 34 in the filter media ring 20; and a hydrophobic foraminous membrane disk 42 that spans the exit passageway 38 for separating water from fuel passing through the hydrophobic foraminous membrane disk 42. In use, fuel passes from outside-to-inside through the filter media ring 20 for removal of particulates and other contaminants from the fuel. The filter media 20 and/or other means may cause water entrained in the fuel to coalesce into bigger droplets at the inside of the filter media 20, which droplets can fall out of the fuel stream before passage out of the filter 10. The hydrophobic foraminous membrane disk 42 will restrict passage out of the filter 10 any droplets that remain and/or are re-entrained in the fuel stream. In this manner the hydrophobic foraminous membrane disk 42 functions as a final barrier to water remaining in the fuel stream, thereby eliminating or substantially reducing the amount of water passing from the filter 10 to downstream components.

In the illustrated embodiment, the filter media ring 10 is housed in a cylindrical canister or housing 12 having first and second ends, for example, upper and lower ends 14 and 16, and an internal chamber 18. The filter media ring 20 is disposed within the internal chamber 18, has a central axis A and has bonded to the top and bottom ends thereof end caps 36 and 44, respectively.

In some embodiments, the filter media ring 20 and end caps 36, 44 may together form a filter, more aptly called a filter element, that can be removably installed in housing typically have a lower portion that can be easily separated from an upper portion to allow for removal and replacement of just the filter element.

Figure 1:
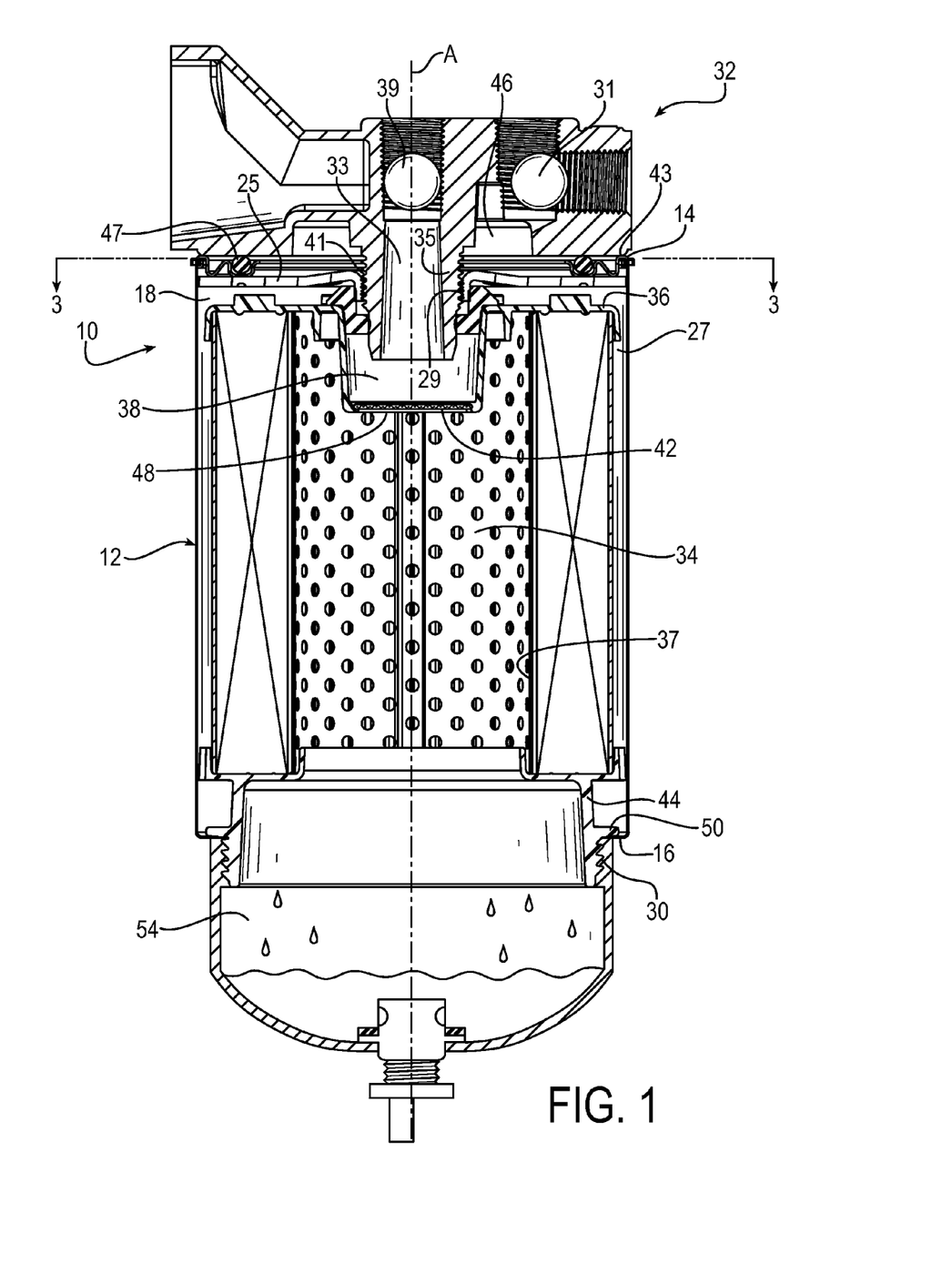
FIG. 1 is a cross-sectional view of an exemplary filter attached to a filter head and including an exemplary upper end cap having an exemplary hydrophobic membrane in accordance with the invention.
Figure 2:
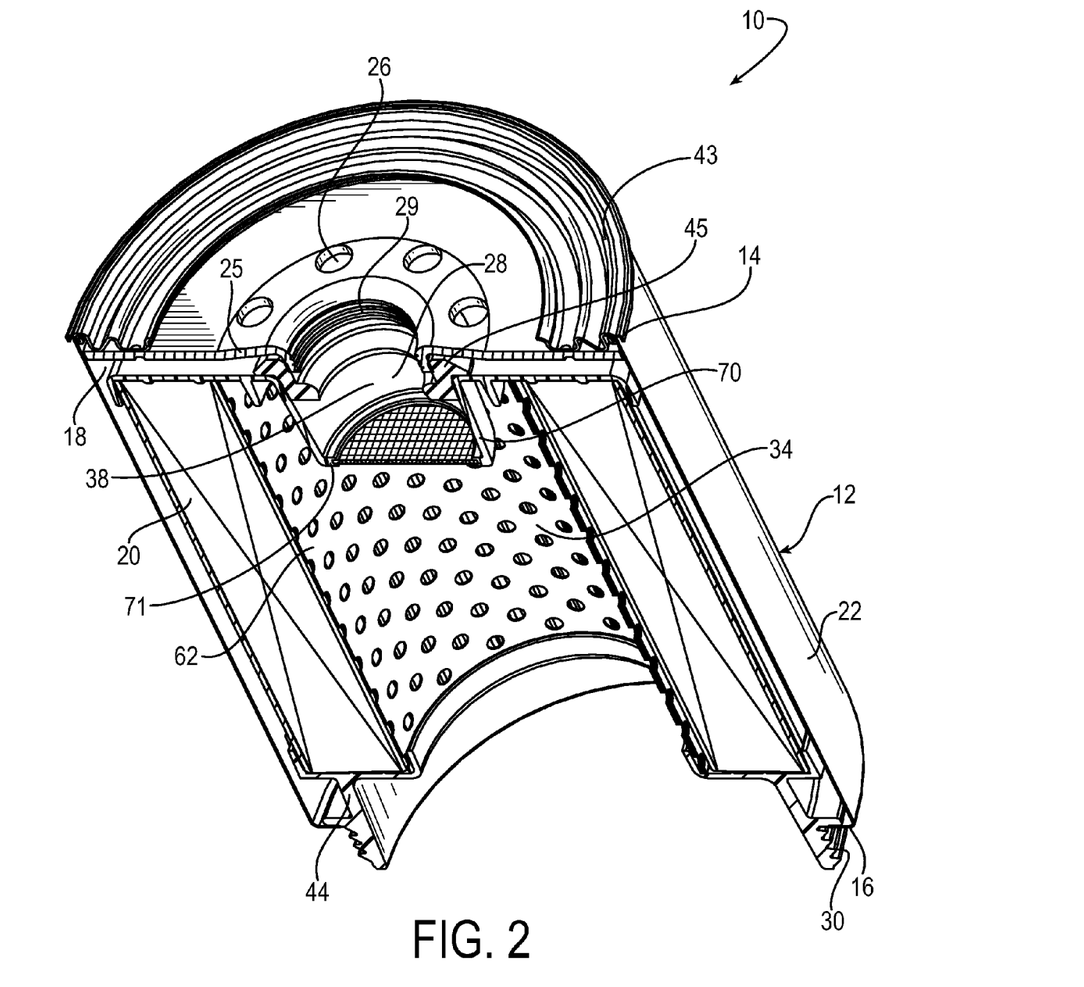
FIG. 2 is a perspective view of the filter, partly broken away in section.
Figure 3:
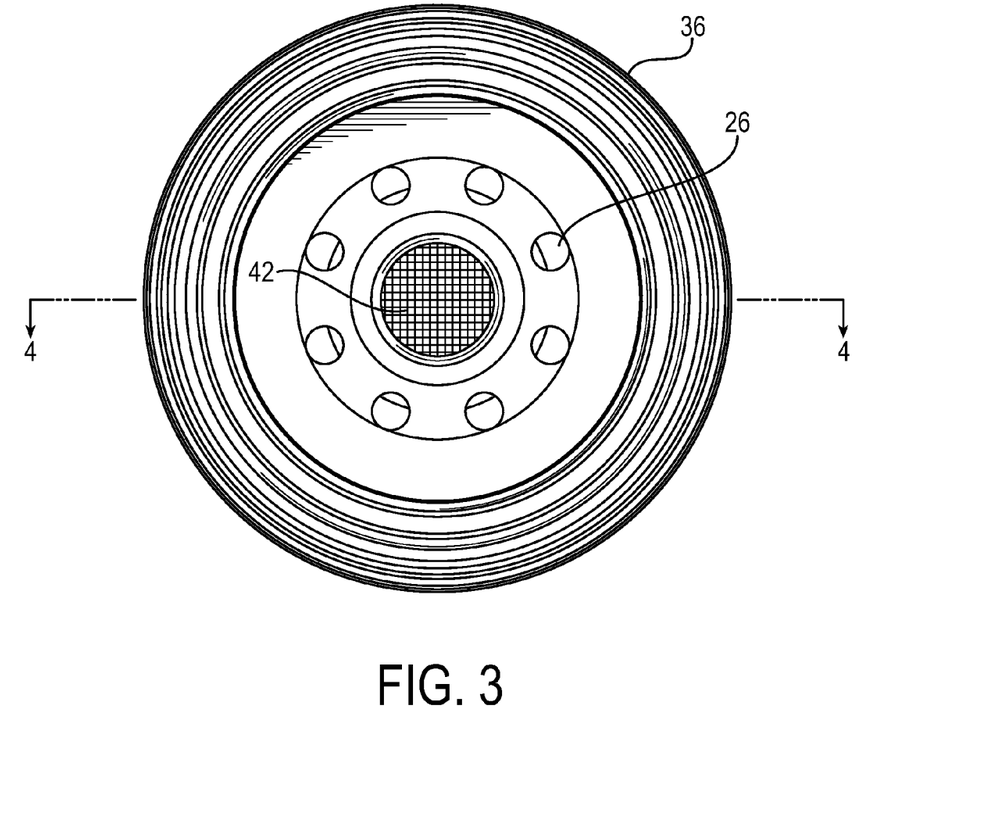
FIG. 3 is a top view of the filter.
Figure 4:
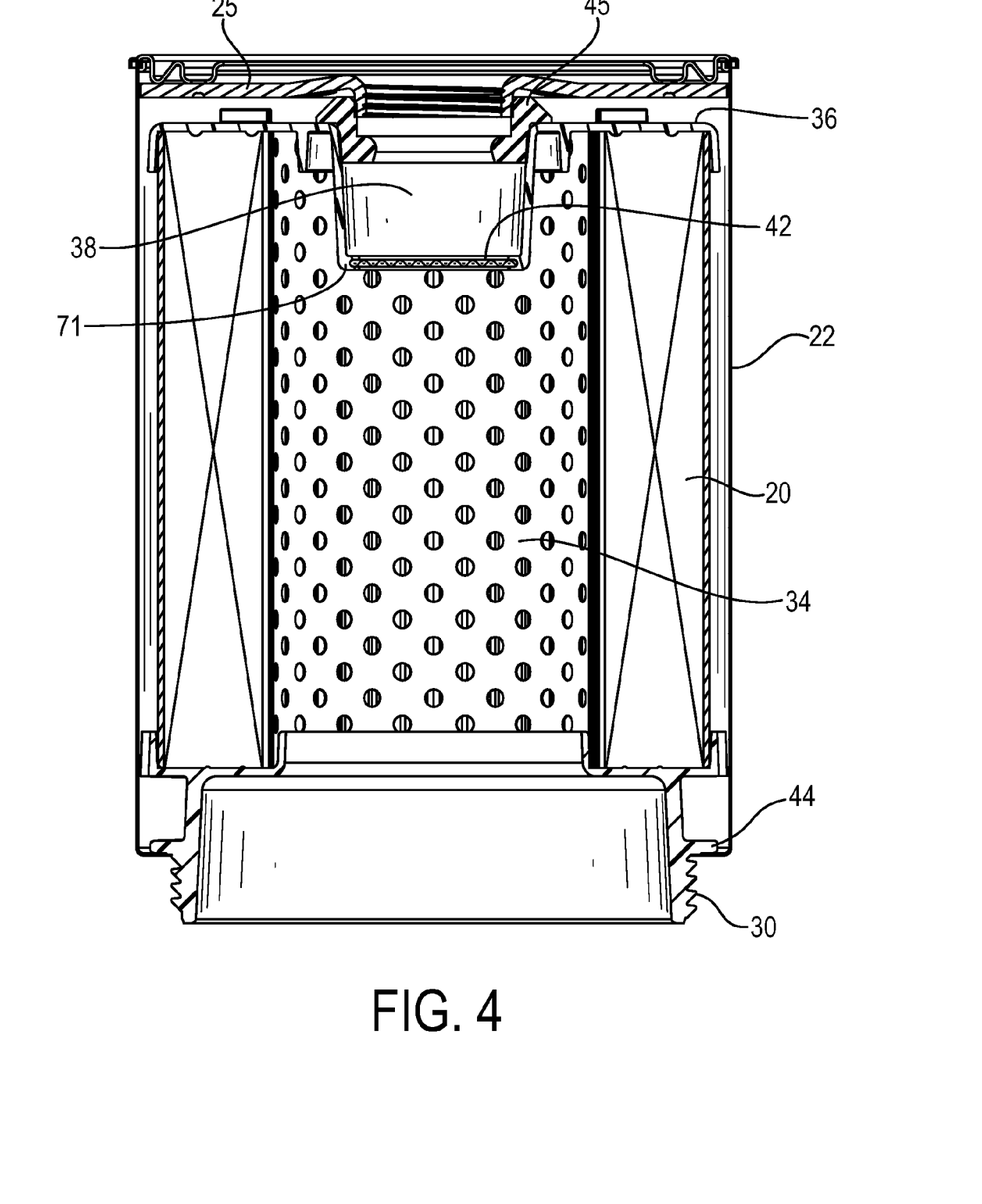
FIG. 4 is a diametrical cross-sectional view the filter.

In the illustrated embodiment, the filter media ring 20 and end caps 36, 44 are integrated into the housing or canister 12 for common attachment and removal from a filter head 32. As shown in FIG. 1, the housing 12 includes an outer casing 22 that preferably is cylindrical. The casing 22 is integrally attached at its lower end 16 to a radially protruding flange 50 on the bottom end cap 44 and at its upper end 14 to a crimp ring or plate 43. Axially sandwiched between the crimp ring 43 and the bottom end cap 44 along with the top end cap 44 and filter media ring 20 is a top plate 25 which is axially interposed between the crimp ring 43 and the top end cap 36. In the illustrated embodiment, the top plate 25 is a tap plate 25 that in conventional manner has an internally threaded central portion 29 for threading onto an externally threaded, downwardly projecting, nipple 35 on the filter head 32.

Also in generally known manner, an annular gasket 45 is interposed between the tap plate 25 and the top end cap 36. The gasket 45 prevents fluid flowing out of the filter 10 through a central opening 28 in the top end cap 36 from flowing into the annular space between the top end cap 36 and the tap plate 25 through which fluid from the filter head 32 flows into the filter 10, and vice versa. The tap plate 25 is provided with one or more inlet openings 26 for passage of fuel from an inlet passage 46, that communicates with an inlet port 31 of the filter head, into the annular space between the end cap 36 and tap plate 25. Preferably a plurality of inlet openings 26 are circumferentially spaced apart to form an annular array to allow fluid to flow therethrough to the annular space within the casing 22. The annular space communicates with an annular space that is formed between the filter media ring 20 and the casing 22 that is radially outwardly spaced from the filter media ring to form such annular space 27. Consequently, flow from the filter head 32 will enter through the tap plate 25 radially outwardly of the annular gasket 45 and flow around the filter media ring 20 and then through the filter media ring 20 into the central cavity 34, where the fluid may pass from the central cavity 34 through the hydrophobic foraminous membrane 42 and out a central opening in the tap plate 25 to the filter head 32.

The annular gasket 45 also serves to seal the top end cap 36 to a lower unthreaded portion of the filter head nipple 35. When the filter head 32 is attached to the filter 10, in this case by threading the tap plate 25 onto the externally threaded portion 41 of the nipple 35, the lower portion of the nipple 35 will telescope into and be sealed against the annular gasket 45 so that flow exiting the central cavity 34 will flow through the interior passage 33 of the filter head nipple 35 and out through an outlet port/passage 39 of the filter head 32.

In the illustrated embodiment, the filter 10 also includes a radially outwardly disposed annular gasket 47 for sealing the crimp ring 43 to a bottom sealing surface of the filter head 32 radially outwardly of the annular array of openings 26 in the tap plate 25. The crimp ring 43 may include an axially outwardly-facing annular groove which receives the annular resilient gasket 47. The annular resilient gasket 47 seals between the bottom of the filter head 32 and top of the filter 10 to prevent fuel leakage. The annular gasket 47 will be compressed between the crimp ring 43 and the filter head 32 when the filter 10 is screwed onto or otherwise engaged with the filter head 32 to direct fuel to an inlet in the filter 10.

As is preferred, the filter has a central support tube 62, also herein referred to as a center tube 62. The center tube 62 internally supports the filter media ring 20 against fluid pressures that otherwise might cause the filter media ring 20 to collapse radially inwardly on itself. The filter media ring 20 may be formed, for example, from an annular array of pleated filter media that has insufficient strength to withstand fluid flow pressures, particularly when the filter is nearing the end of its life and is becoming clogged with particulates which will cause pressure to build up on the inlet side of the filter media 20.

In the illustrated embodiment the centertube 62 is cylindrical and has a plurality of apertures for allowing fuel to flow from the filter media ring 20 into the central cavity 34. The centertube 62 may also be a coalescing centertube that facilitates the formation of water droplets of a size that will flow down the centertube and or drop out of the fuel stream flowing through the central cavity. As shown, the inner surface 37 of the centertube 62 may define the central cavity 34.

As is known in the art, the apertures may contain therein coalescing material to cause smaller water drops to coalesce into larger water drops that will drop out of the fuel stream and fall to the bottom of the filter 10 where they can be collected. In the illustrated embodiment, the bottom end cap 44 has a central opening to allow the water droplets to fall into a collection bowl 54 attached to the lower end of the bottom end cap 44. As shown, the upper portion of an annular wall of the collection bowl 54 may be internally threaded for screwing onto an externally threaded portion 30 of the bottom end cap 44 that projects below the flange 50. A seal may be provided between the underside of the flange and the top edge of the collection bowl 54 to prevent leakage therebetween. The collection bowl 54 can be easily removed to permit removal of collected water, or the water can be more conveniently removed by opening a drain provided at the bottom of the collection bowl 54.

Figure 5:
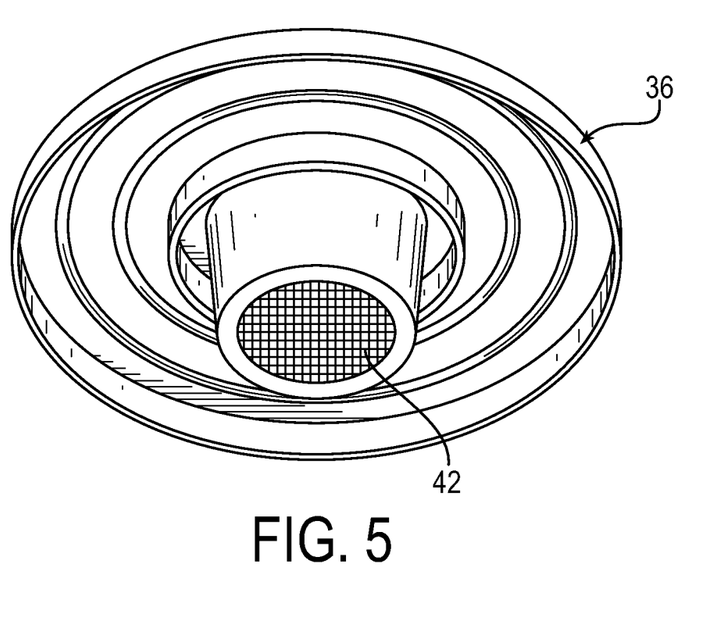
FIG. 5 is a perspective view of the upper end cap.
Figure 6:
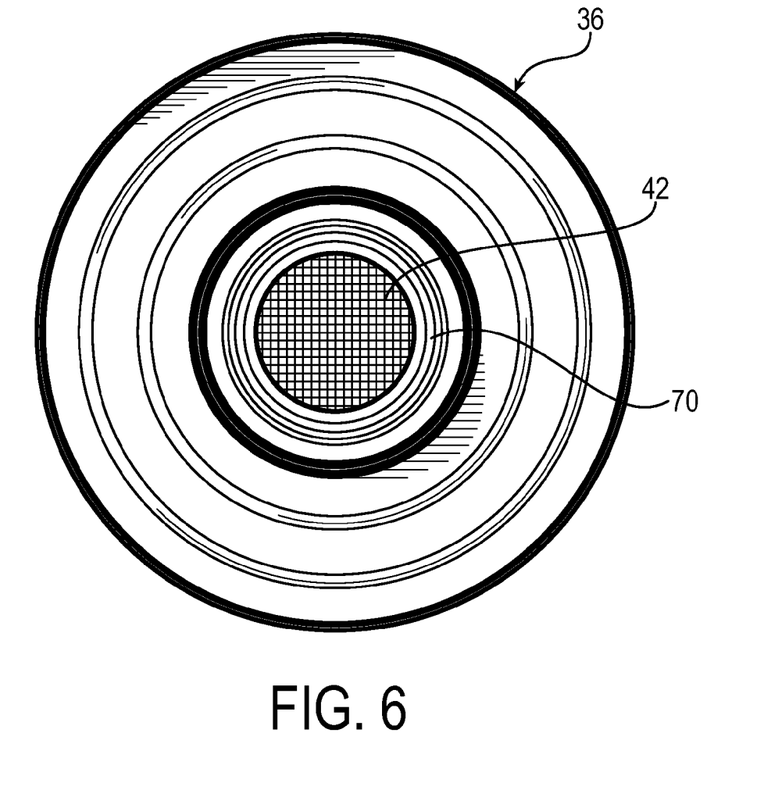
FIG. 6 is a bottom view of the upper end cap.
Figure 7:
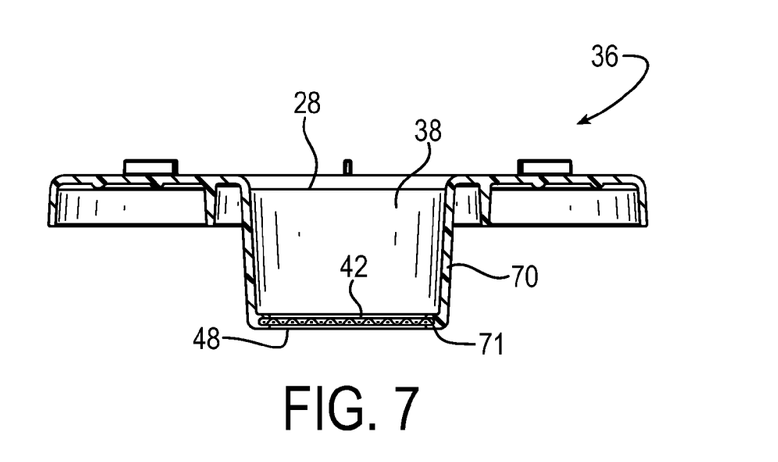
FIG. 7 is a cross-sectional view of the upper end cap.

Turning to FIGS. 5-7, details of the top end cap 36 can be more easily seen. The top end cap 36 has an axially extending tubular wall 70 (a tubular wall is an annular wall that forms a tubular structure) and an upper radial wall 72 that extends radially from an upper portion of the tubular wall 70. The upper radial wall 72 provides a bonding surface for bonding material used to bond the filter media ring 20 to the top end cap 36. The tubular well wall 70 defines a well for receiving the lower end portion of the nipple of the filter head when the filter is assemble to the filter head 32, as seen in FIG. 1. As is preferred, the tubular wall 70 is radially inwardly spaced from the centertube 62 and filter media ring 20 so as not to block flow through the upper portions of the centertube 62 and filter medial ring 20. The tubular wall 70 interiorly defines the exit passageway 38 that opens at a bottom opening 48 to the central cavity 34. The tubular wall may have a radially inwardly extending flange that defines the bottom opening 48. As will be discussed further below, this flange provides a convenient surface for attachment of the below discussed hydrophobic foraminous membrane disk 42.

The lower end of the tubular well wall 70 provides a convenient location to mount the hydrophobic foraminous membrane disk 42, which could also be referred to as a patch that is attached to span the opening 48.

As is preferred, the hydrophobic foraminous membrane disk 42 preferably is located in the upper portion of the central cavity 34 and more preferably in the upper quarter of the central cavity 34.

Also, it is preferred that the hydrophobic foraminous membrane disk 42 be spaced from the lower end of the nipple 35 (or other inlet to the filter head 32) so as to allow for flow across the full extent of the opening 38 that is spanned by the hydrophobic foraminous membrane disk 42.

Figure 12:
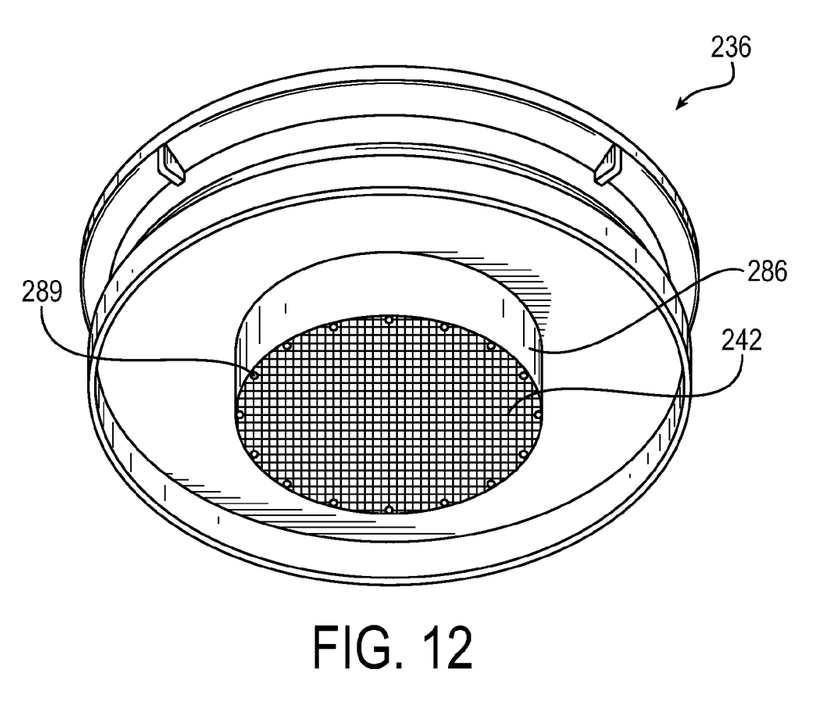
FIG. 12 is a perspective view of the upper end cap of FIG. 11.

The hydrophobic foraminous membrane disk 42 may be attached, particularly at its peripheral edge, to the top end cap 36 and particularly the tubular well wall 70 by any suitable means. For example, the hydrophobic foraminous membrane disk 42 can be staked to the lower end or lower end face (or in particular to the flange 71 of the tubular wall 70 (as shown in FIG. 12), or the tubular wall, particularly at the flange 71, can be overmolded on the screen, or vice versa, or otherwise secured to the tubular wall 70. The hydrophobic foraminous membrane disk 42 could alternatively or additionally be bonded to the end of the tubular wall 70 by a bonding agent. Another option is to overmold the top end cap onto the hydrophobic foraminous membrane disk 42 inasmuch as the top end cap 36 will typically be molded from a plastic material. The hydrophobic foraminous membrane disk 42 could even be removably attached to the filter 10, or held in place by a snapped on, clamped, trapped or other arrangement.

The hydrophobic foraminous membrane disk 42 may be formed by a sheet of woven or nonwoven screen. For example, a 20-30 micron screen may be used. The screen may be woven from fibers that are coated with hydrophobic material. By way of a particular example, a core fiber made of plastic or metal may be used to provide suitable strength characteristics and the core fibers may be coated with a hydrophobic material such as polyolefins, such as polypropylene, polyether ether Ketone ("PEEK"), fluoropolymers, or polyester, etc. Alternatively, the screen can be coated with a hydrophobic material after being woven or otherwise formed. This coating may be applied to one or both sides, and preferably at least to the upstream side of the screen.

The hydrophobic foraminous membrane disk 42 may have, for example, a thickness in the range of 0.0001-0.05 inches. When compared to thickness of the tubular wall, the disk may be no thicker than the wall thickness of the tubular wall.

As should now be apparent, the hydrophobic foraminous membrane disk 42 hinders the free mobility of water to restrict passage through the hydrophobic foraminous membrane disk 42 and thereby prevent or minimize water from passing through the membrane. In other words, water droplets in the fuel cannot pass freely through the membrane and thus will be removed from the fuel.

Figure 8:
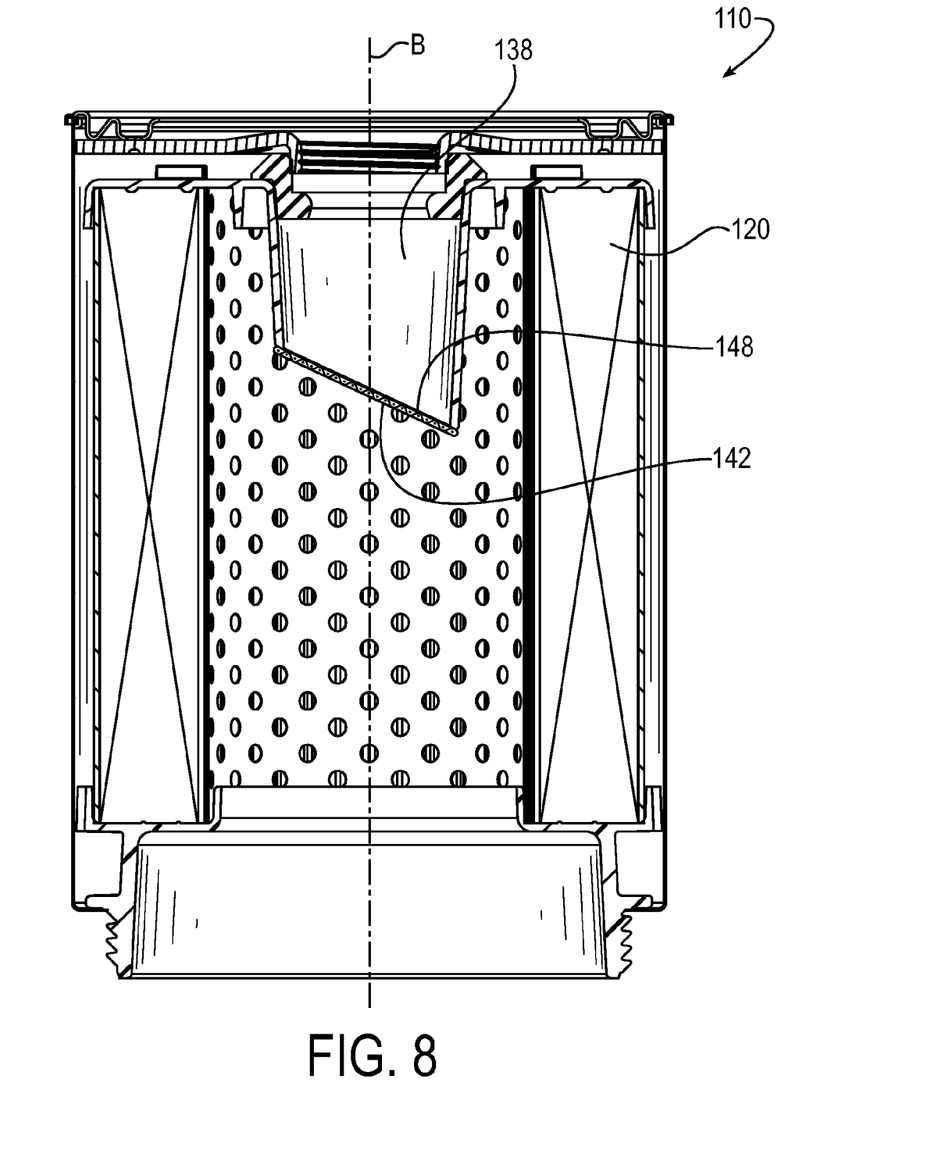
FIG. 8 is a diametrical cross-sectional view of another exemplary filter including another exemplary end cap having an exemplary angled hydrophobic membrane.
Figure 9:
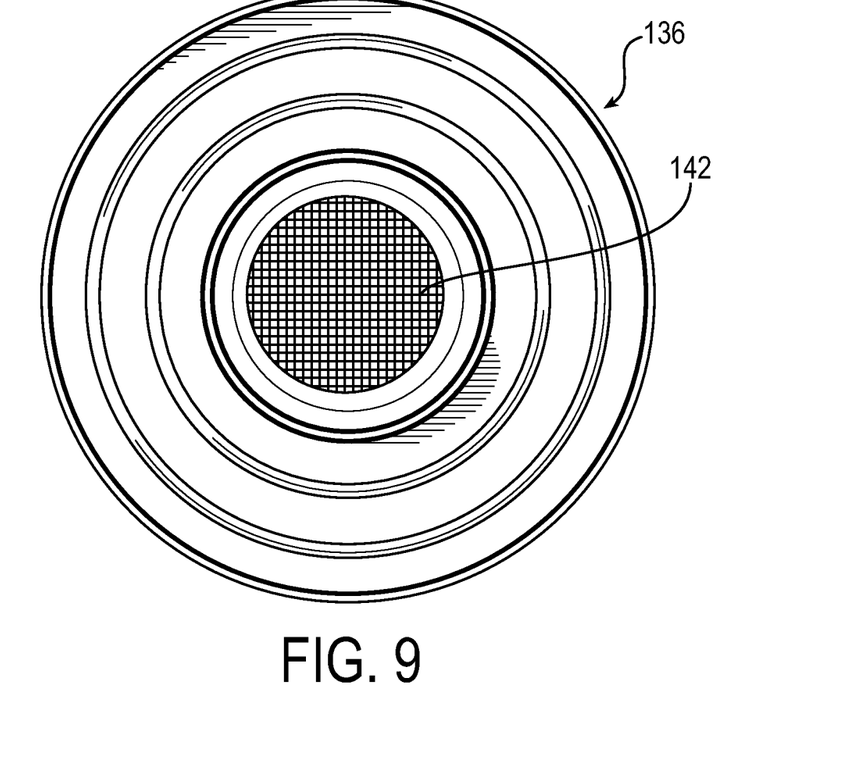
FIG. 9 is a top view of the upper end cap in the filter of FIG. 8.
Figure 10:
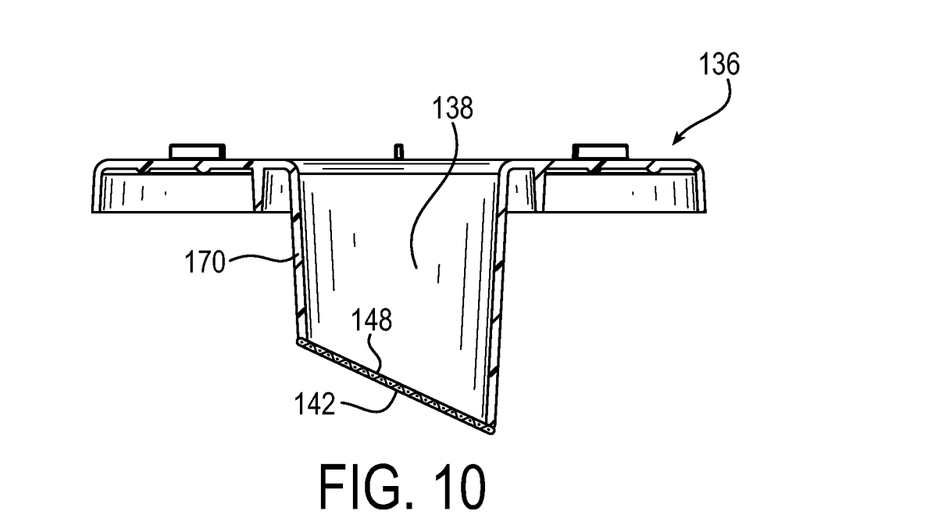
FIG. 10 is a cross-sectional view of the exemplary end cap of FIG. 8.

Turning now to FIGS. 8-10, another exemplary embodiment of a filter according to the invention is shown at 110. The filter 110 is substantially the same as the above-referenced filter 10, and consequently the same reference numerals, but indexed by 100, are used to denote structures corresponding to similar structures in the filter 110. In addition, the foregoing description of the filter 10 is equally applicable to the filter 110 except as noted below.

Like the filter 10, the filter 110 includes a tubular wall 170 forming an exit passage 138 of the top end cap 136. In the filter 10, the lower end of the tubular wall, and thus the entry opening, resides in a plane orthogonal to the axis B of the filter media ring 120 and the filter 110 in general. In the filter 110, the lower end of the lip of the tubular wall 170, and the associated entry opening 148, are not orthogonal but instead tilted at an incline to the axis of the filter media ring/filter 20. Like in the filter 10, the filter 110 includes a hydrophobic foraminous membrane disk 142 that spans the inlet opening 148 to the exit passageway 138 and likewise is inclined to the center axis B of the filter media ring 120.

In an embodiment, the hydrophobic foraminous membrane disk 142 forms a 45 degree angle or less with the central axis B. Alternatively, the angle may be no greater than 30, 20, 10 or 5 degrees.

The angled hydrophobic foraminous membrane disk 42 provides increased area for flow across the membrane, albeit at the cost of requiring more membrane material. In addition, the angled hydrophobic foraminous membrane disk 142 may in some instances promote better removal from the membrane of water that may accumulate on the upstream side of the hydrophobic foraminous membrane disk 142.

Figure 11:
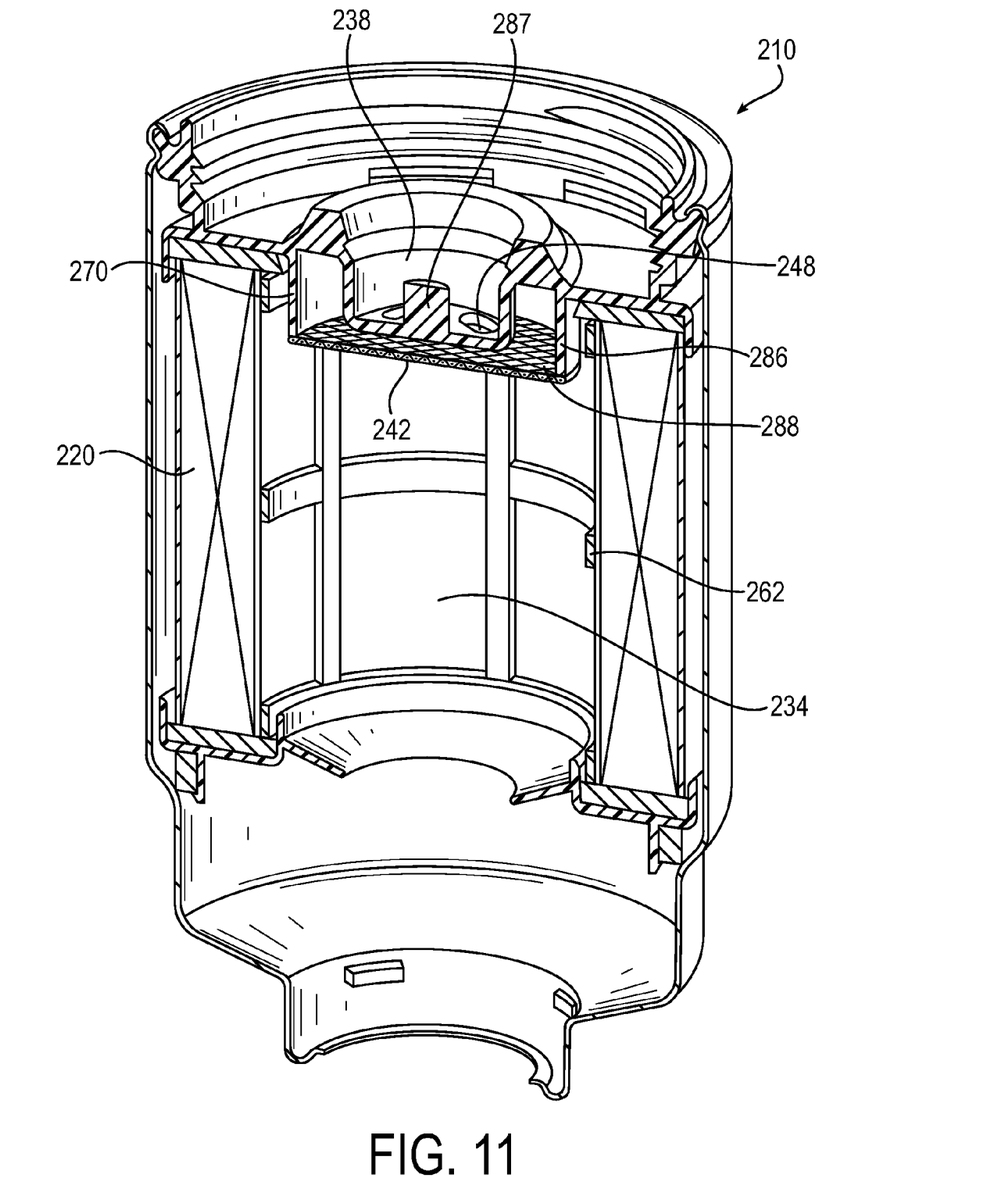
FIG. 11 is a perspective view, broken away in section, of yet another exemplary filter including yet another exemplary upper end cap having yet another exemplary hydrophobic membrane.

Turning now to FIGS. 11 and 12, another exemplary embodiment of a filter according to the invention is shown at 210. The filter 210 is similar in many respect to the above-referenced filters 10 and 110, and consequently the same reference numerals, but indexed by 200, are used to denote structures corresponding to similar structures in the filter 210. In addition, the foregoing description of the filter 10 is equally applicable to the filter 210 to the extent similar structures are shown. Moreover, it will be appreciated upon reading and understanding the specification that aspects of the filters 10, 110 and 210 may be substituted for one another or used in conjunction with one another where desirable.

The filter 210 illustrates one way principles of the invention may be applied to a filter where the tubular well wall 270 may need to have structure 287 spanning the inlet opening 248 to provide, for example, a projection for actuating a valve in a filter head. Fuel flows from outside to inside through the filter media ring 220 and through the centertube 262, if provided, into the central cavity 234. Fuel exits the central cavity 234 by flow through one or more in the supporting structure 287 and an exit passageway 238 defined by the tubular well 270 of the top end cap 236.

Consequently, the inlet opening 248 at the bottom of the well is partially blocked by the supporting structure 287. The inlet opening 248 could still be spanned by a single hydrophobic foraminous membrane disk 242 or multiple smaller hydrophobic foraminous membrane disks that respectively cover the inlet opening 248 or sub-openings defined by the supporting structure 287. While still functional, the supporting structure 287 reduces the functional area of the hydrophobic foraminous membrane disk 242 or membranes, and would result in higher pressures acting on the membrane for a given flow condition.

As an alternative and as shown in FIGS. 11 and 12, a second tubular wall 286 may be provided radially outwardly of the inner tubular wall 270, and preferably projects to a lower elevation than the inner tubular wall 270. The hydrophobic foraminous membrane disk 242 spans the inlet opening 288 of the outer tubular wall 286 which forms an exit passageway leading to the exit passageway formed the inner tubular wall. The hydrophobic foraminous membrane disk 242 preferably is attached to the lower end of the outer tubular wall 286, such as in any of the attachment mechanisms described above in connection with the filter 10. For example, one or more heat stakes 289 may secure the hydrophobic foraminous membrane disk 242 at its outer peripheral edge portion to the outer tubular wall 286. The heat stakes 289 may be circumferentially spaced apart or may be continuous.

Because of the lower elevation, the cross-sectional area of the hydrophobic foraminous membrane disk 242 is not blocked by the supporting structure 287. The larger diameter of the inlet opening 288 of the outer tubular wall 286 also provides for increased flow area across the hydrophobic foraminous membrane disk 242. The larger cross-section enables a larger flow through velocity of fuel and enables prevention of more water particles per unit of time from moving through the hydrophobic foraminous membrane disk 242 and reaching downstream components.

Figure 13:
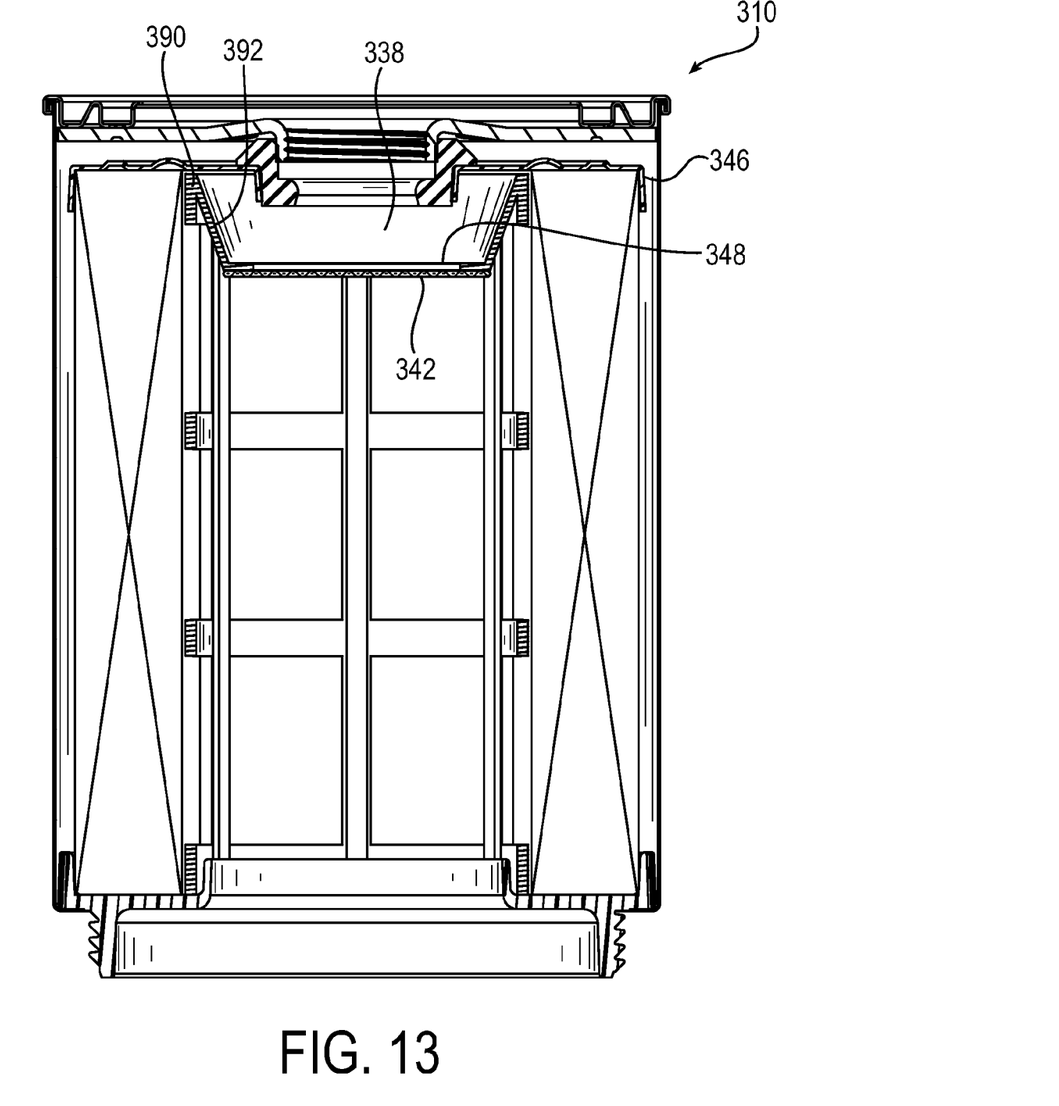
FIG. 13 is a cross-sectional view of still another exemplary filter wherein a centertube has at its upper end a tubular portion forming an exit opening that is spanned by a hydrophobic membrane disk.
Figure 14:
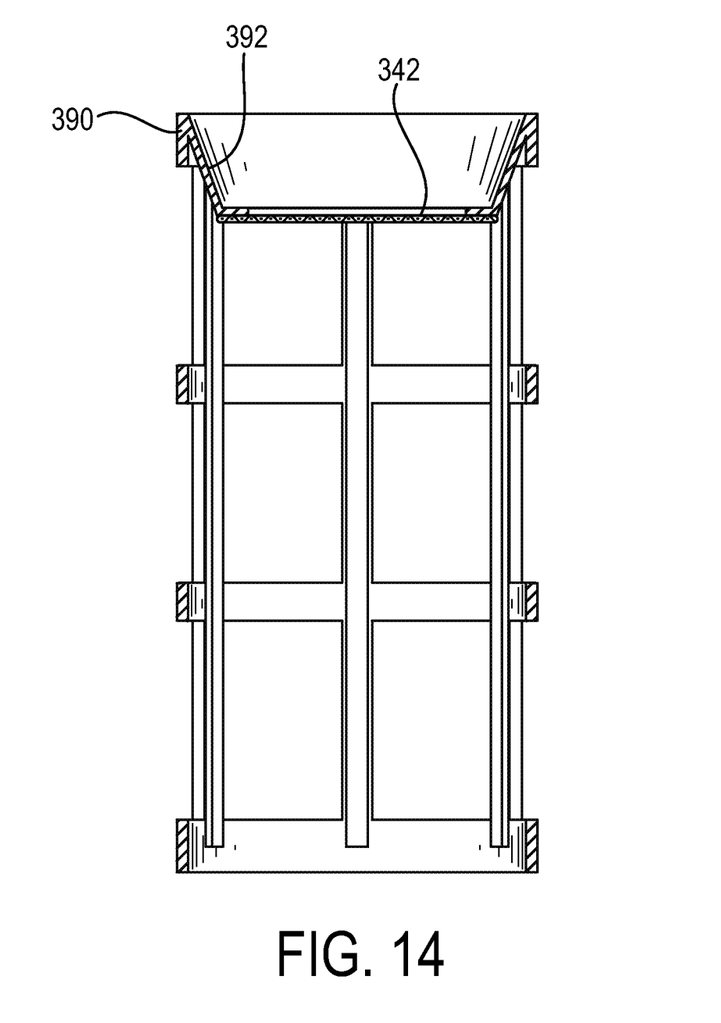
FIG. 14 is a cross-sectional view of the centertube of FIG. 13.

Turning now to FIGS. 13 and 14, another exemplary embodiment of a filter according to the invention is shown at 310. The filter 310 is similar in many respects to the filters 10, 110 and 210, and consequently the same reference numerals, but indexed by 300, are used to denote structures corresponding to similar structures in the filter 310. In addition, the foregoing description of the filter 10 is equally applicable to the filter 310 with regard to similar structures. Moreover, it will be appreciated upon reading and understanding the specification that aspects of the filters 10, 110, 210 and 310 may be substituted for one another or used in conjunction with one another where applicable.

In the filter 310, the tubular well wall 392 is not provided on the upper end cap 346 but instead is provided on the centertube 390. The centertube 390 may be like the centertube 90 of the filter 10, but in the filter 310 the centertube 390 is more in the form of a supporting frame with larger openings that may or may not include coalescing material in the openings in the frame.

In the filter 310, the tubular wall 392 that defines an exit passageway is joined at its upper end to the centertube 390 and depends downwardly and inwardly such that the tubular wall 392 is radially inwardly spaced from the centertube 390. As shown, the tubular wall 392 and the centertube 390 may be formed as a single piece, as by molding from a plastic material or otherwise. In the illustrated embodiment the tubular wall 390 angles away from the centertube 392 progressively increasing the radial spacing therebetween. The tubular wall 390 is annularly continuous, as are the other tubular walls described herein, so as to define the exit passageway that opens to the central cavity at an inlet opening.

A hydrophobic foraminous membrane disk 342 spans the inlet opening 348 of the exit passageway 338 and may be attached to the lower end of the outer tubular wall 392 as described above in connection with the filter 10.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter including:
a ring of filter media circumscribing a central cavity;
an exit passageway that is downstream of the central cavity and that has an inlet opening disposed within the central cavity;
an imperforate tubular wall defining at least a portion of the inlet opening; and
a hydrophobic foraminous membrane disk that spans the inlet opening for separating water from fuel passing through the hydrophobic foraminous membrane disk, wherein an outer periphery of the hydrophobic foraminous membrane disk abuts the imperforate tubular wall, and wherein the hydrophobic foraminous membrane disk is a mono-layer of material having a plurality of passages bounded by hydrophobic material and through which fuel can pass;
wherein the hydrophobic foraminous membrane disk is attached at its peripheral edge to the imperforate tubular wall; and
wherein the disk is attached by at least one of staking or overmolding.

2. The filter of claim 1, including a top end cap sealingly bonded to a top end of the ring of filter media, and a bottom end cap sealingly bonded to a bottom end of the ring of filter media.

3. The filter of claim 2, wherein a centertube is provided interiorly of the ring of filter media for supporting the ring of filter media against radial inward collapse.

4. The filter of claim 3, wherein the centertube is a coalescing centertube.

5. The filter of claim 1, wherein the exit passageway is formed by the imperforate tubular wall terminating at the inlet opening that opens axially into the central cavity.

6. The filter of claim 5, including a top end cap sealingly bonded to a top end of the ring of filter media, and wherein the imperforate tubular wall is depended from the top end cap.

7. The filter of claim 5, including a centertube of the ring of filter media for supporting the ring of filter media against radial inward collapse, and wherein the imperforate tubular wall is directly supported by the centertube.

8. The filter of claim 5, wherein the imperforate tubular wall forms a well that accommodates a nipple of a filter head to which the filter may be removably attached.

9. The filter of claim 5, wherein the central cavity is bounded by an annular surface defining an empty space in which the fuel can flow, and the imperforate tubular wall is radially inwardly spaced from the annular surface.

10. The filter of claim 1, further including a reservoir fluidly connected to the central cavity, whereby coalesced water particles accumulate in the reservoir.

11. The filter of claim 1, wherein the ring of filter media has a central axis, and a planar extent of the hydrophobic foraminous membrane disk is orthogonal to the central axis.

12. The filter of claim 1, wherein the ring of filter media has a central axis, and a planar extent of the hydrophobic foraminous membrane disk forms an acute angle with the central axis.

13. The filter of claim 1, wherein the filter includes a housing surrounding the ring of filter media and forming a fluid passageway between the housing and the ring of filter media.

14. The filter of claim 1, wherein the filter includes a threaded portion at an upper end of the filter for a spin-on connection between the filter and a filter head.

15. The filter of claim 1, wherein the hydrophobic foraminous membrane disk has a thickness of 0.0001-0.05 inches.

16. In an end cap or centertube for a filter,
an imperforate tubular wall forming a through passageway extending between open ends of the imperforate tubular wall; and
a hydrophobic foraminous membrane disk that spans the passageway for separating water from fuel passing through the hydrophobic foraminous membrane disk, wherein an outer periphery of the hydrophobic foraminous membrane disk abuts the imperforate tubular wall, and wherein the hydrophobic foraminous membrane disk is a mono-layer of material having a plurality of passages bounded by hydrophobic material and through which fuel can pass;
whereby water particles immersed in a fuel flowing through the hydrophobic foraminous membrane disk would be unable to freely flow downstream with the fuel;
wherein the hydrophobic foraminous membrane disk is attached to an axial end face of the imperforate tubular wall; or the outer periphery of the hydrophobic foraminous membrane disk is embedded in a radially inward facing cavity that is radially offset from a central portion of the hydrophobic foraminous membrane disk and that is defined by the imperforate tubular wall, and stakes or overmolding attach the outer periphery to the imperforate tubular wall.

17. The end cap or centertube of claim 16, wherein the hydrophobic foraminous membrane disk is attached at its peripheral edge to the imperforate tubular wall.

18. The end cap of claim 16, wherein the hydrophobic foraminous membrane disk is orthogonal to a longitudinal axis of the imperforate tubular wall.

19. The end cap of claim 16, wherein the hydrophobic foraminous membrane disk forms an acute angle with a longitudinal axis of the imperforate tubular wall.

20. The end cap of claim 16, wherein the hydrophobic foraminous membrane disk has a thickness of 0.0001-0.05 inches.

21. A filter including:
a ring of filter media;
a cylindrical housing enclosing the ring of filter media, the housing including an end cap at an open end of the housing, with flow passages to enable fuel to enter and exit the housing and pass through the media;
an imperforate portion defining at least a portion of an exit passage; and
a water barrier disk in the housing located in the fluid flow to prevent water in the flow from passing through the exit passage, wherein an outer periphery of the water barrier disk abuts the imperforate portion, and wherein the water barrier disk is a mono-layer of material having a plurality of passages through which fuel can pass;
wherein the water barrier disk is attached to an axial end face of the imperforate portion; or the outer periphery of the water barrier disk is embedded in a radially inward facing cavity that is radially offset from a central portion of the water barrier disk and that is defined by the imperforate portion, and stakes or overmolding attach the outer periphery to the imperforate portion.

22. The filter of claim 21, wherein the water barrier disk is supported by the end cap.

23. A filter and filter head assembly, including:
a ring of filter media circumscribing a central cavity;
an exit passageway downstream of the central cavity and that has an inlet opening communicating with the central cavity;
an imperforate tubular wall defining at least a portion of the inlet opening; and
a hydrophobic foraminous membrane disk that spans the inlet opening for separating water from fuel passing through the hydrophobic foraminous membrane disk, wherein an outer periphery of the hydrophobic foraminous membrane disk abuts the imperforate tubular wall, and wherein the hydrophobic foraminous membrane disk is a mono-layer of material having a plurality of passages bounded by hydrophobic material and through which fuel can pass;
wherein the hydrophobic foraminous membrane disk is attached to an axial end face of the imperforate tubular wall; or the outer periphery of the hydrophobic foraminous membrane disk is embedded in a radially inward facing cavity that is radially offset from a central portion of the hydrophobic foraminous membrane disk and that is defined by the imperforate tubular wall, and stakes or overmolding attach the outer periphery to the imperforate tubular wall.

* * * * *

UNITED STATES PATENT AND TRADEMARK OFFICE
CERTIFICATE OF CORRECTION

PATENT NO. : 9,546,626 B2  
APPLICATION NO. : 14/199596  
DATED : January 17, 2017  
INVENTOR(S) : Jeffrey W. LaForge and Lewis A. Wolfe Page 1 of 1

It is certified that error appears in the above-identified patent and that said Letters Patent is hereby corrected as shown below:

On the Title Page

Item (72):
"Inventor: Jeffrey W. LaForge, Oakdale, CA (US)"

Should read:
-- Inventors: Jeffrey W. LaForge, Oakdale, CA (US); Lewis A. Wolfe, Colorado Springs, CO (US) --

Signed and Sealed this
Twenty-third Day of May, 2017

Michelle K. Lee
*Director of the United States Patent and Trademark Office*